United States Patent [19]
Riga

[11] Patent Number: 6,085,796
[45] Date of Patent: Jul. 11, 2000

[54] DUAL CONTAINMENT HYDRAULIC SYSTEM

[76] Inventor: Dennis J. Riga, 4026 Baughman Grant, New Albany, Ohio 43054

[21] Appl. No.: 09/126,919

[22] Filed: Jul. 31, 1998

[51] Int. Cl.⁷ ........................................... F16L 9/18
[52] U.S. Cl. ................ 138/114; 138/30; 138/109
[58] Field of Search ....................... 138/114, 109, 138/172, 111, 30

[56] References Cited

U.S. PATENT DOCUMENTS

| | | | |
|---|---|---|---|
| 2,838,074 | 6/1958 | Lauck | 138/114 X |
| 3,301,277 | 1/1967 | Kelly | 138/114 |
| 3,831,635 | 8/1974 | Burton | 138/114 |
| 4,349,049 | 9/1982 | Silvey | 138/103 |
| 4,446,892 | 5/1984 | Maxwell | 138/104 |
| 4,650,471 | 3/1987 | Tamari | 138/114 X |
| 4,930,549 | 6/1990 | Renner | 138/104 X |
| 5,101,918 | 4/1992 | Smet | 138/114 X |
| 5,156,190 | 10/1992 | Staley, Jr. | 138/104 |
| 5,244,016 | 9/1993 | Kuroda et al. | 138/103 |
| 5,285,826 | 2/1994 | Sanders et al. | 138/114 X |
| 5,518,034 | 5/1996 | Ragout et al. | 138/104 |
| 5,590,981 | 1/1997 | Osborne | 138/114 X |
| 5,720,325 | 2/1998 | Grantham | 138/114 X |
| 5,762,108 | 6/1998 | Hunter | 138/114 X |

FOREIGN PATENT DOCUMENTS

2854016 7/1980 Germany .
2023296 5/1979 United Kingdom .

*Primary Examiner*—Patrick Brinson
*Attorney, Agent, or Firm*—Locke Liddell & Sapp LLP

[57] ABSTRACT

A dual containment hydraulic system includes an inner hose for transmitting and containing pressurized fluids and an outer hose completely encasing the inner hose. The inner and outer hoses are capped and sealed together at each end and secured in place by a locking device, thereby creating a bladder between the outer surface of the inner hose and the inner surface of the outer hose, to contain any fluids leaking from the inner hose should a break occur. The locking device may be sandwiched between two floating bolts and the outermost set of floating bolts may be reverse threaded. The density of the wall of the outer hose and the volume of the bladder of the dual containment hydraulic system may be varied so as to (i) maintain equalized pressure of any contained fluid leaking from the inner hose after a break in the inner hose or (ii) allow for controlled reduction in both volume and pressure of the contained fluid. Other embodiments of the dual containment system include: (i) inner and outer hoses capped and sealed together at each end and secured in place by a locking device, thereby creating a bladder encompassing a portion of the capping and sealing device; and (ii) an inner hose attached at each end to a hard line with an outer hose completely encasing the inner hose and the attaching device and capped and sealed together with the hard line, thereby creating a bladder encompassing the inner hose and the attaching device.

21 Claims, 5 Drawing Sheets

DUAL CONTAINMENT HYDRAULIC SYSTEM

SPECIFICATION

FIELD OF THE INVENTION

The present invention relates to a dual containment hydraulic system.

BACKGROUND OF THE INVENTION

Almost all lawn and turf maintenance equipment utilize hydraulic powering systems to drive, steer and stop the equipment. Hydraulic systems are also used to power the specific purpose implements attached to such equipment to perform specific lawn and turf maintenance tasks. For example, in the case of a fairway mower, a hydraulic system is used to provide steering, forward and reverse movement, to provide braking for all wheels in a straight line and to control brake bias when attempting to decrease the turning radius. Hydraulic systems also raise, lower, activate, engage, back draft, back spin and back wash specific purpose implements. Depending on the number of functions to be performed, a single piece of equipment may contain up to 30 hydraulic hoses.

Figure 1:
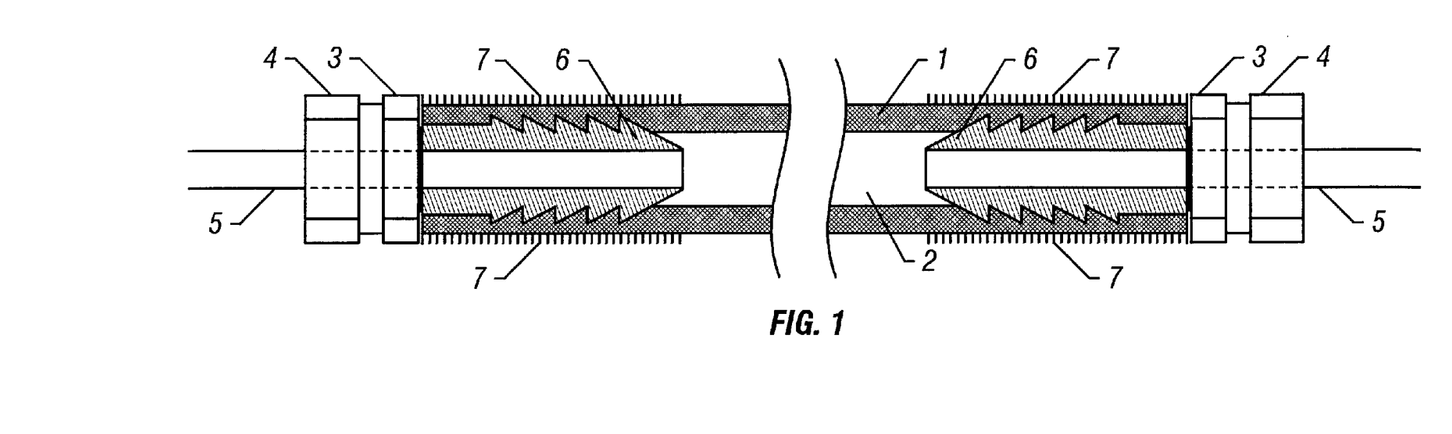
FIG. 1 is a conventional single wall hydraulic hose of the prior art.

At the core of the hydraulic system is a hydraulic pump which may be internal or external to the main hydraulic reservoir. In this reservoir, hydraulic fluid is stored or pressurized. Fluid temperatures may range from 250° F. to 550° F. depending on the amount of power to be delivered by each hose in order to activate a given function. As seen in FIG. 1, conventional single wall hydraulic hoses 1 typically are fabricated using rubber like material which may be reinforced with a steel, aluminum or other metal or synthetic mesh woven interior fabric. Ferrel portions 6 are capped at each end with a threaded tightening bolt 3 secured with free bolt 4. A pressure fit is created with hard line 5 at one end from the hydraulic reservoir or pump and at hard line 5 at the other end going to a specific purpose attachment. The inside of the hose is represented as 2. The ferrel portion 6 is fitted around hose 1 by crimp 7.

Such conventional single wall hoses are known to frequently rupture and leak under pressure regardless of the age of the hose. Repeated bending and crimping, freeze and thaw cycles, stress caused by heat and pressure, human error in production, improper replacement and untimely maintenance are all factors which lead to frequent ruptures and leaks in conventional single wall hoses. A microscopic pinhole in a conventional single wall hose will explode under pressure spewing hot pressurized liquid onto the equipment, the operator and into the environment.

The use of fabric deflection and disbursement shields has helped to prevent injury to the operators; however, the environment still remains unprotected. Even the use of an alarm signaling a break in a hose may not prevent the blistering fluid from escaping into the environment and burning the turf. Such an accident will cause an unsightly brown area to appear in the turf creating a turf care crisis which can only be remedied over time and at extraordinary expense. Regardless of whether the turf is a professional sporting stadium, a resort golf course or a public park, the results of a break in a hydraulic hose on turf care equipment may be disastrous.

For the foregoing reasons there is a need for a dual containment hydraulic system which at a relatively low cost protects the operator from the harm and the environment from the damage caused by a hydraulic hose rupture and allows for continued operation or automatic shutdown of the maintenance equipment.

SUMMARY OF THE INVENTION

The present invention is directed to an apparatus that satisfies the need for a dual containment hydraulic system which at a relatively low cost protects the operator from the harm and the environment from the damage caused by a hydraulic hose rupture and allows for continued operation or automatic shutdown of the maintenance equipment. A dual containment hydraulic system having the features of the present invention comprises an inner hose for transmitting and containing pressurized fluids and an outer hose completely encasing such inner hose. Such inner and outer hoses are capped and sealed together at each end and the means for capping and sealing is secured in place by a locking device. A bladder is created between the outer surface of such inner hose and the inner surface of such outer hose. The bladder is designed to contain any pressurized fluids leaking from the inner hose should a break occur in the inner hose. The inner and outer hoses may be capped and sealed together at each end with couplers which may be friction fit couplers, screw couplers or torque fit couplers. The locking devices may be sandwiched between two floating bolts and the outermost set of floating bolts may be reverse threaded. The locking devices may be secured to a hard line coming from a fluid reservoir or pump and a hard line going to a specific purpose attachment.

The density of the wall of the outer hose and the volume of such bladder may be designed so as to (i) maintain equalized pressure of any contained fluid leaking from the inner hose after a break in the inner hose or (ii) allow for a controlled reduction in both volume and pressure of the contained fluid, depending on the volume between the inner and outer hoses.

Another embodiment of the dual containment hydraulic system of the present invention comprises an inner hose for transmitting and containing pressurized fluids and an outer hose completely encasing such inner hose. Such inner and outer hoses are capped and sealed together at each end and the means for capping and sealing are secured in place by a locking device, thereby creating a bladder between the outer surface of such inner hose and the inner surface of such outer hose which encompasses a portion of the means for capping and sealing the inner and outer hoses together.

An additional embodiment of the dual containment hydraulic system of the present invention comprises an inner hose for transmitting and containing pressurized fluids. Such inner hose is attached at each end to a hard line coming from a fluid reservoir or pump and going to a specific purpose attachment. An outer hose completely encases the inner hose and the means for attaching each end of said inner hose to the hard line. The outer hose is capped and sealed together at each end creating a bladder between the outer surface of such inner hose and the inner surface of such outer hose.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

As used herein, a specific purpose attachment shall refer to any implement utilizing hydraulic powering systems to raise, lower, activate, engage, drive, steer, brake, back draft, back spin, back wash or adjust height or speed, including without limitation, lawn care, turf and golf course maintenance equipment and any other equipment utilizing critical hydraulics. A hard line shall refer to a metal line or tube welded directly to a hydraulic reservoir or pump or acting as a point of connection for a specific purpose attachment.

Figure 2:
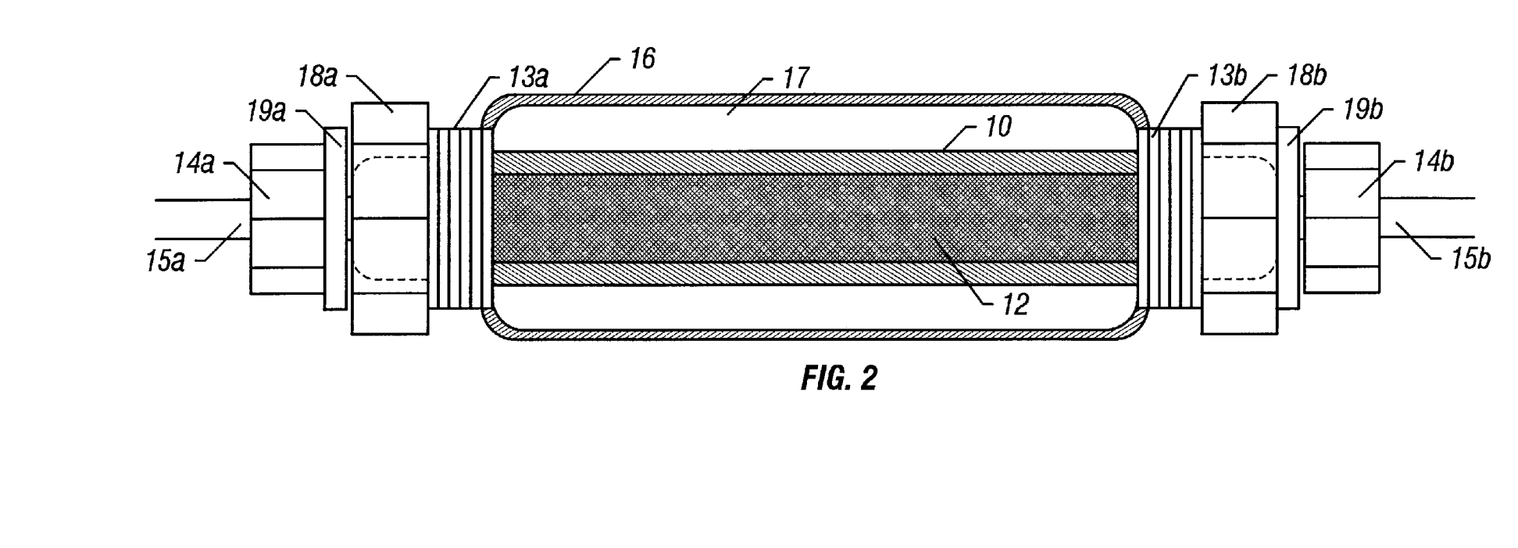
FIG. 2 is a schematic front view of an embodiment of a dual containment hydraulic system made in accordance with the present invention.

An exemplary dual containment hydraulic system of the invention is set forth in FIG. 2. (For ease of understanding, the ferrel portion of the system is not illustrated in FIGS. 2–6, though typically it would be present.) The system of the invention may be characterized as having a smaller outer wall thickness to receive fluid at lower pressure. As depicted, the system consists of an inner hose 10 for transmitting and containing pressurized fluids, an outer hose 16 completely encasing the inner hose 10, a means for capping and sealing together the inner and outer hoses at each end 13a and 13b, thereby creating a bladder 17 between the outer surface of the inner hose and the inner surface of the outer hose for containing pressurized fluids leaking from the inner hose after a break in the inner hose. The system further contains a locking means 19a and 19b for securing the capping and sealing means in place at each end of the inner and outer hoses.

The means for capping and sealing the inner and outer hoses 13a and 13b may consist of couplers including friction fit couplers, screw couplers or torque fit couplers. The locking means 19a and 19b may be sandwiched between two floating bolts 14a and 14b and 18a and 18b. The locking means 13a and 13b may be secured to a hard line 15a and 15b coming from a fluid reservoir or pump and going to a specific purpose attachment. The outermost set of floating bolts 14a and 14b may be reverse threaded.

The outer hose 16 may be composed of reinforcement rubber-like material such as polyurethane as well as thermoplastic fibrous materials such as nylon, polyester, polypropylene or blends of the same. The hose may be reinforced with conventional reinforcement materials in the art 12 including metallic fabric such as steel or aluminum mesh woven fabric. Inner hose 10 may be made of conventional materials in the art such as polyurethanes, polyolefins, polyurethane-polyolefin blends, polyvinyl chloride, and the like.

Figure 3:
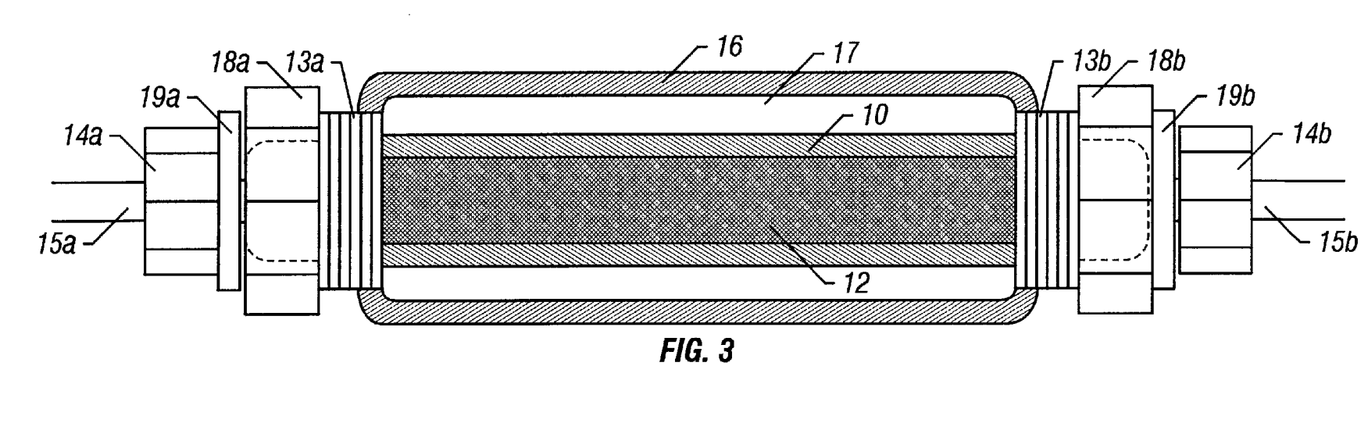
FIG. 3 is a schematic front view of the dual containment hydraulic system of FIG. 2 with an outer hose wall density equal to the inner hose wall density.

As illustrated in FIG. 3, the dual containment hydraulic system of the invention may have equal wall thickness to allow for continued operation. This system may feature an outer hose 16 wall which has sufficient density and a bladder 17 which has restricted volume to maintain equalized pressure of the contained fluid leaking from the inner hose after a break and allow for continued operation after a break of the inner hose at prescribed performance levels.

Figure 4:
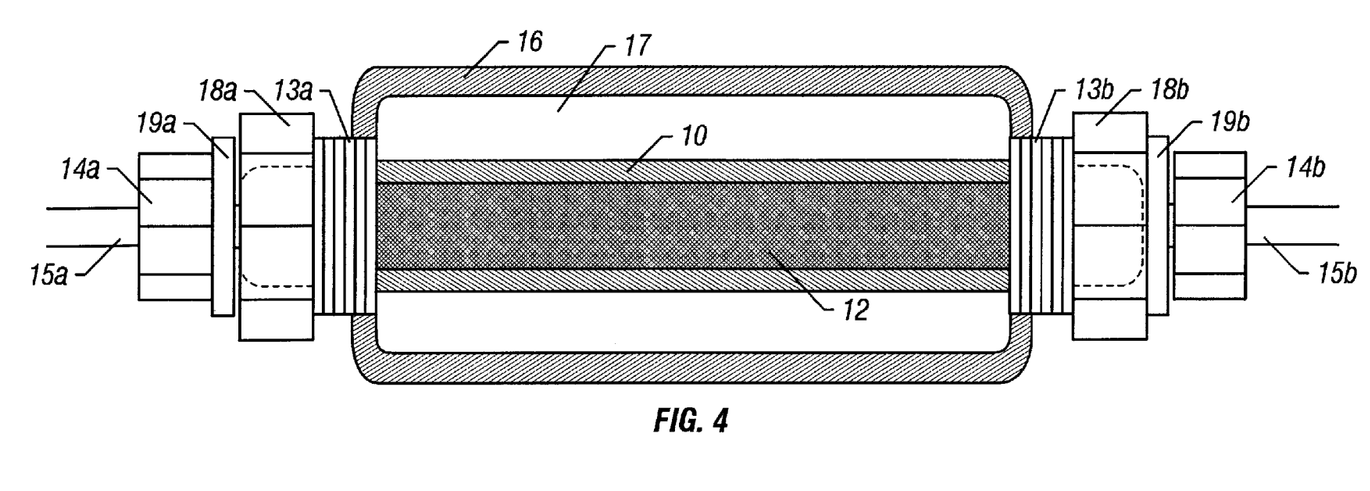
FIG. 4 is a schematic front view of the dual containment hydraulic system of FIG. 2 showing a large volume bladder.

The dual containment hydraulic system of FIG. 4 features an outer hose 16 wall which has sufficient density and a bladder 17 which has sufficient volume to allow for a reduction in volume and pressure of the contained fluid thus disabling operation or triggering a mechanical or electronic alarm system which may be present on or around the system.

Figure 5:
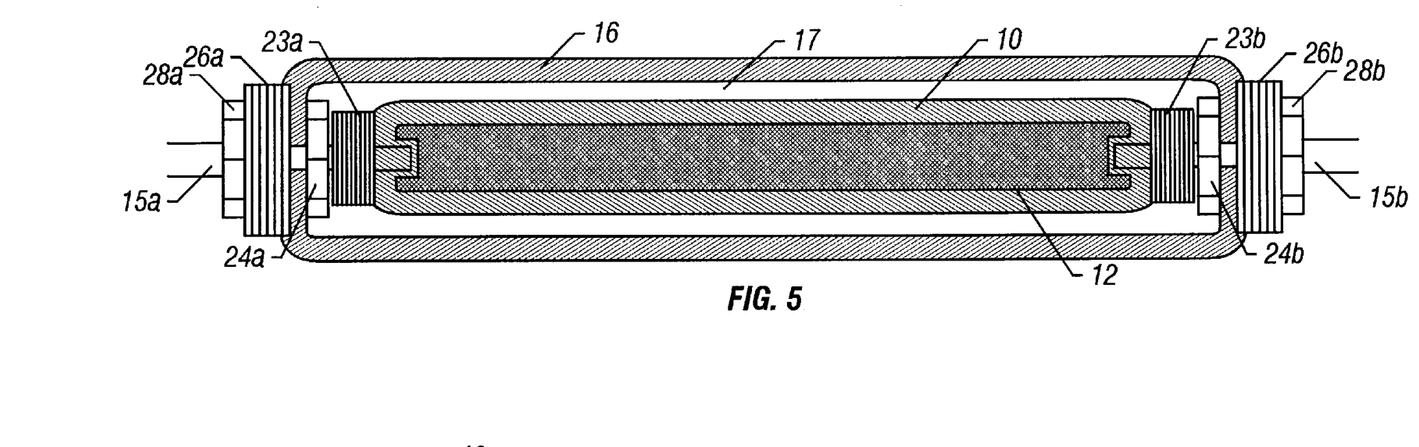
FIG. 5 is a schematic front view of the dual containment hydraulic system made in accordance with the present invention and showing the bladder completely encasing the inner hose and the means for attaching each end of the inner hose to the hard line.

A variation of the dual containment hydraulic system of the invention is illustrated in FIG. 5 wherein an undersized bladder 17 allows for continual operation. It includes the inner hose 10 and the outer hose 16 capped and sealed together at each end through couplers 23a and 23b. Couplers 23a and 23b, which are internal to the outer hose, are separated from the outer hose by floating bolt 24a and 24b, respectively. The external surface of the outer hose is connected to hard line 15a and 15b through couplers 26a and 26b and floating bolts 28a and 28b, respectively. Capping and sealing means 23a and 24a as well as 23b and 24b are completely encased by outer hose 16 and are encompassed by bladder 17.

Figure 6:
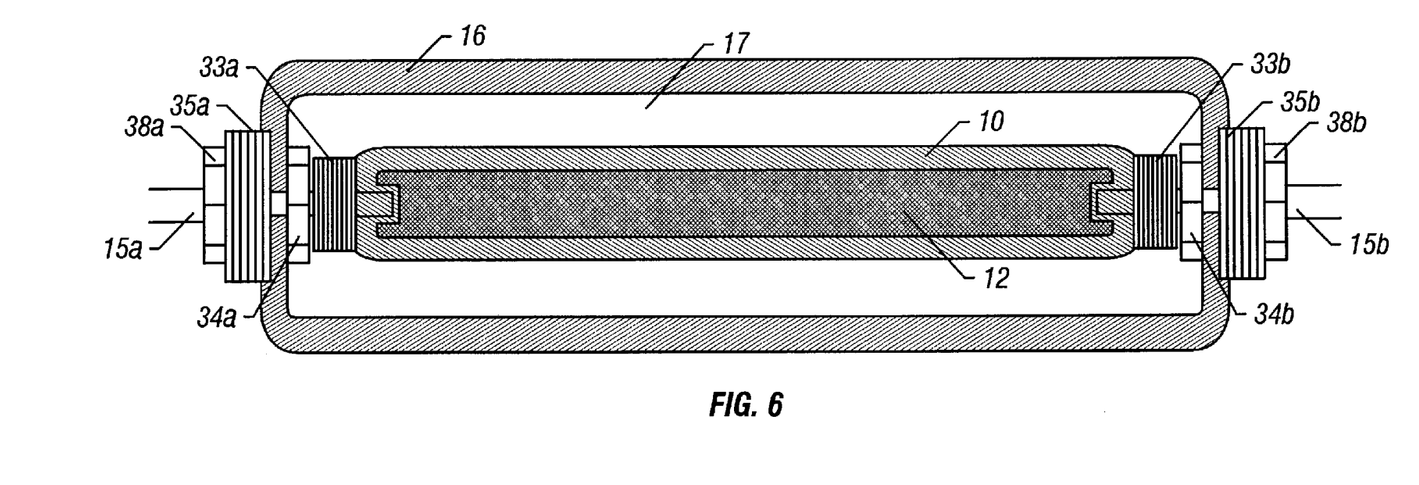
FIG. 6 is a schematic front view of the dual containment hydraulic system of FIG. 5 showing a large volume bladder.

A still further variation of the dual containment hydraulic system of the invention is set forth in FIG. 6. This system includes the inner hose 10, a means for attaching each end of the inner hose to hard line 15a and 15b, the outer hose 16 completely encasing both the inner hose 10 and the means for attaching the inner hose at each end to the hard lines 33a and 34a and 33b and 34b, and a means for capping and sealing the outer hose 16 and the hard lines 15a and 15b at each end creating a bladder 17. The means for attaching the inner hose 10 at each end to the hard lines 15a and 15b may consist of couplers including friction fit couplers, screw couplers or torque fit couplers 33a and 33b and a means for securing such coupler at each end of the inner hose 34a and 34b. The means for securing the coupler at each end of the inner hose may consist of a floating bolt. The means for capping and sealing the outer hose 16 at each end to the hard lines 15a and 15b may consist of two locking devices 35a and 35b locking the means for attaching each end of the inner hose to the hard lines 34a and 33a and 33b and 34b in place and two reverse threaded devices 38a and 38b attaching the locking devices to a hard line 15a and 15b. The reverse threaded devices 38a and 38b may consist of reverse threaded floating bolts.

The inner and outer hoses of the dual containment hydraulic system of FIGS. 3–6 are of approximately equal wall thickness. Such hoses have sufficient density which, when coupled with bladder 17, render sufficient volume to maintain equalized pressure of the contained fluid leaking from the inner hose after a break and allow for continued operation after a break of the inner hose at prescribed performance levels.

FIGS. 4 and 6 feature an outer hose 16 wall having sufficient density and a bladder 17 with sufficient volume to allow for a reduction in volume and pressure of the contained fluid thus disabling operation or triggering a mechanical or electronic alarm system present on current model equipment.

Figure 7:
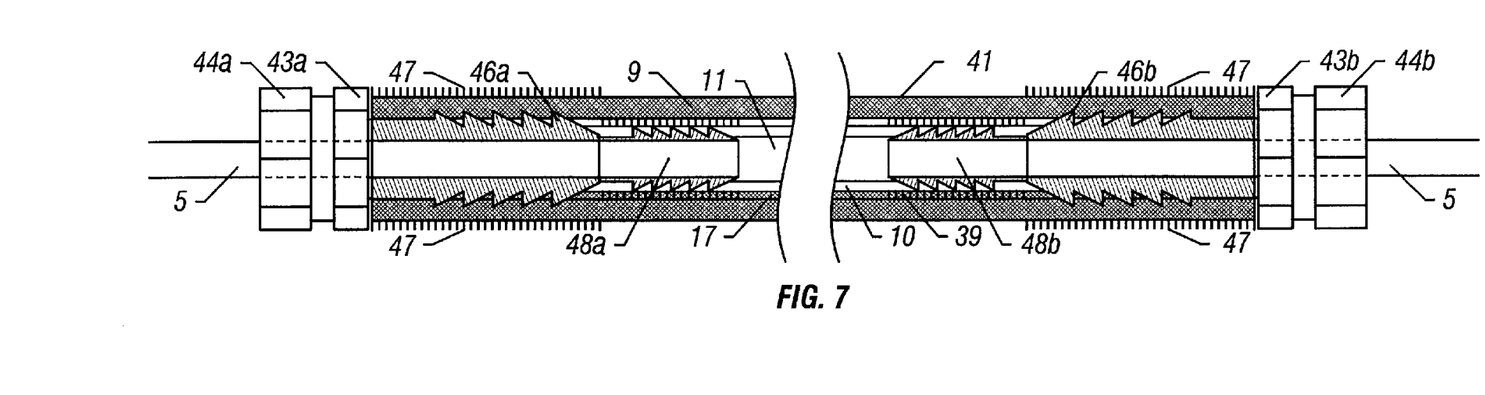
FIG. 7 is a schematic front view of the dual containment hydraulic system of the invention comprising a double ferrel within a double hose.
Figures 8A, 8B:
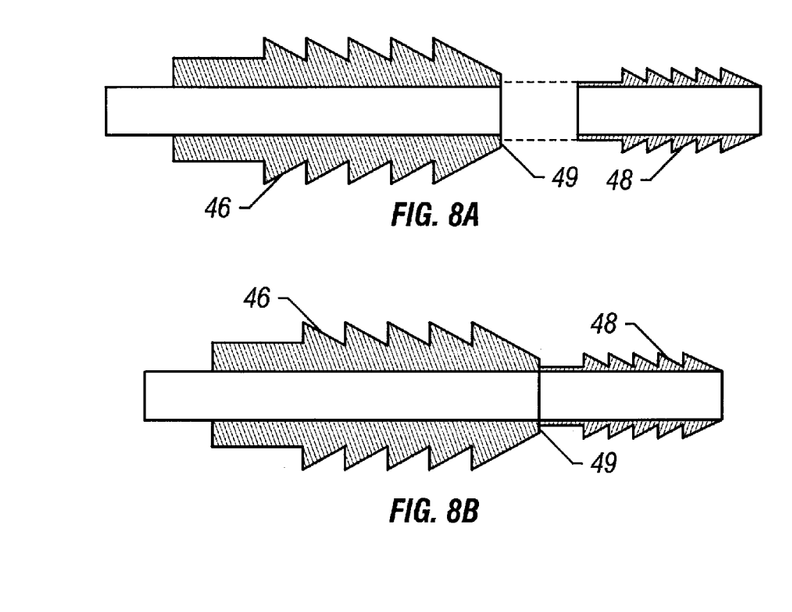
FIG. 8a is an exploded schematic view of a ferrel fitted onto a larger ferrel as used in FIG. 6.
FIG. 8b is a schematic elevational view of a ferrel fitted onto a larger ferrel as used in FIG. 6.
Figure 9:
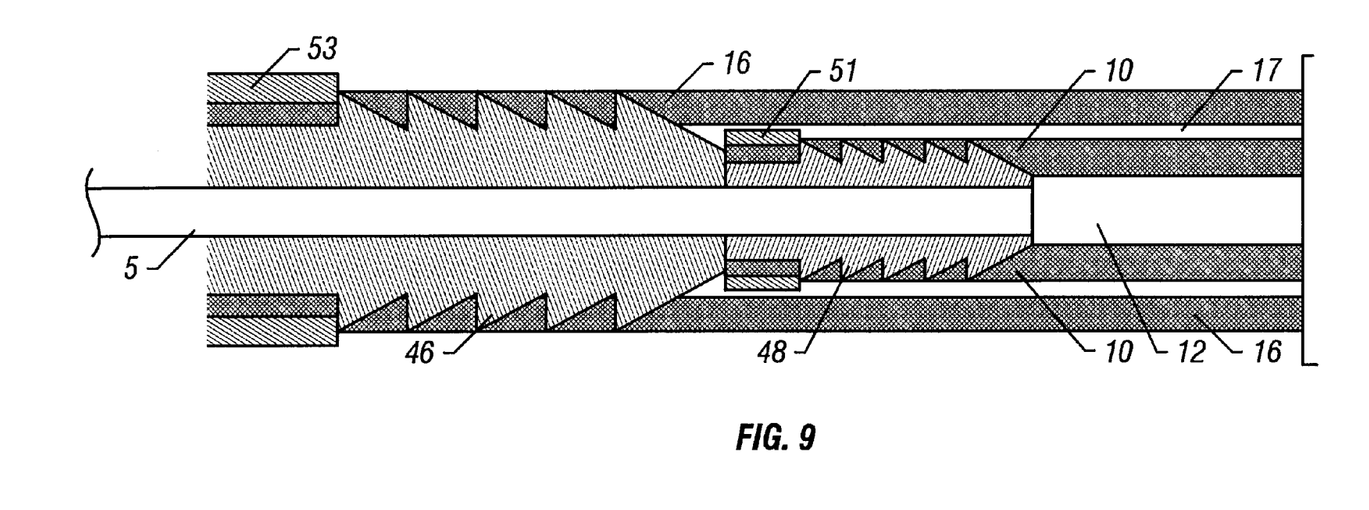
FIG. 9 is an enlarged view of a portion of the dual containment hydraulic system of FIG. 7.

FIG. 7 sets forth another embodiment of the invention using the ferret composite depicted in FIG. 8b. The ferret composite is produced by securing, by welding or other conventional means, a ferret (nipple) 48 onto a larger ferret 46 at interface 49 as shown in FIG. 8a. As such, no reverse threaded torque couplers are required. FIG. 9 depicts a close-up elevational view of a dual containment hose within the invention depicting a single ferret composite. The smaller ferrel is fitted around inner hose 10 by clamp 51. The larger ferrel is fitted around outer hose 16 by clamp 53 such as a tightening bolt. In place of clamps 51 and 53, the ferrels may be either machined or welded to the surface or adhered to the surface. The use of the smaller ferret increases the possible interior area defined by bladder 17.

Referring now to FIG. 7, the dual containment system contains two ferret composites. The first composite represented by smaller ferret 48a welded to larger ferret 46a is positioned adjacent to tightening bolt 43a. The second composite represented by smaller ferret 48b welded to larger ferret 46b such that larger ferrel 46b is positioned adjacent to tightening bolt 43b. The system further comprises outer reinforced flexible hose wall 41 and an inner hose wall 10 for transmitting and containing pressurized fluids. Industry standard crimp 47 encompasses the exterior of the outer hose. Outer hose 41 completely encases inner hose 10. The inner and outer hoses are capped at each end with a fixed tightening bolt 43a and 43b which can be machined or welded to the ferret. Industry standard crimp 39 may further line the most exterior portion of inner hose 10. Bladder 17 is created between the outer surface of the inner hose and the inner surface of the outer hose for containing pressurized fluids leaking from the inner hose after a break in the inner hose. Coupling means, such as free bolts 44a and 44b secures the hose assembly to hard line 5.

Figure 10:
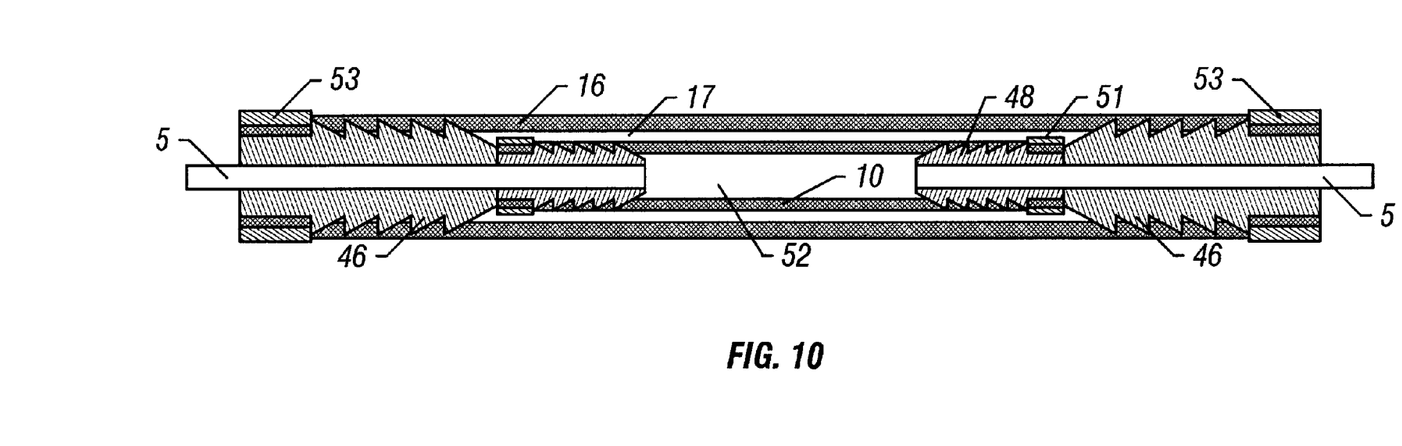
FIG. 10 is a schematic elevational view of a dual containment hydraulic system of the invention.

Finally, the dual containment system of the invention requiring no reverse threadeed torque couplers may be illustrated as shown in FIG. 10. As shown, liner hose 10 is friction fitted over small ferrel 48 and then machine crimped in place by means of conventional crimping. Inner hose interior 52 is encased by inner hose wall 10. Outer hose 16 in the same manner is friction fitted over inner hose 10 and large ferrel 46 and secured by crimping clamp 53. Bladder 17 is thereby created.

The dual containment hydraulics system will contain pressurized fluids leaking from a break in the inner hose and prevent such pressurized fluids from causing injury to the operator or damage to the environment. The dual containment hydraulic system is a closed system that contains all leaking fluids within the outer hose and does not require a secondary reservoir to hold the fluids or a secondary alarm or detection system to warn the operator of a break in the inner hose. However, the outer hose wall density and the bladder volume may be designed to allow controlled reduction in volume or pressure below the prescribed operating level and cause operations to cease or trigger mechanical or electronic alarm systems present on current model equipment. In the alternative, the outer hose wall density and the bladder volume may be designed to maintain volume and pressure within the hydraulic system and prevent the shutdown of operation or any alarming, and allow continued operation.

The previously described versions of the present invention have numerous uses including use in connection with lawn care, sporting turf and golf course maintenance equipment, as well as any other equipment utilizing critical hydraulics.

The previously described versions of the present invention have many advantages, including without limitation the following advantages: (i) the system does not require a secondary alarm or detection system to notify the operator of a break in the inner hose but may trigger an existing alarm present on the equipment; (ii) the system does not require a secondary reservoir to contain the fluids; (iii) the system is relatively inexpensive to implement; (iv) the system allows for continued operation or automatic shutdown of equipment.

Although the present invention has been described in considerable detail with reference to certain preferred versions thereof, other versions are possible. For example the present invention may have application in the field of residential plumbing as a protection to homes, apartments and office buildings from damage resulting from the breakage of water pipes and hoses. In addition, the present invention may be applied to pipes and hoses on appliances which utilize water such as dishwashers and washing machines. Further, the present invention may be applied to underground irrigation systems for lawns, golf courses or sporting turf. Therefore, the spirit and scope of the appended claims should not be limited to the description of the preferred versions contained herein.

I claim:

1. A dual containment hydraulic system comprising:
   (a) an inner hose;
   (b) an outer hose completely encasing such inner hose;
   (c) a means for capping and sealing together said inner and outer hoses at each end, thereby creating a bladder between the outer surface of such inner hose and the inner surface of such outer hose for containing pressurized fluids leaking from the inner hose after a break in the inner hose; and
   (d) a locking means for securing said capping and sealing means in place at each end of said inner and outer hoses wherein the density of the wall of such outer hose and the volume of such bladder are sufficient to maintain equalized pressure of the contained fluid leaking from the inner hose after a break in said inner hose.

2. The dual containment hydraulic system according to claim 1, wherein the means for capping and sealing said inner and outer hoses comprises a coupler.

3. The dual containment hydraulic system according to claim 2, wherein the coupler is a friction fit coupler, screw coupler or torque fit coupler.

4. The dual containment hydraulic system according to claim 1, wherein the locking means are sandwiched between two floating bolts.

5. The dual containment hydraulic system according to claim 4, wherein the outermost set of floating bolts are reverse threaded.

6. A dual containment hydraulic system comprising:
   a. an inner hose for transmitting and containing pressurized fluids;
   b. an outer hose completely encasing such inner hose;
   c. a means for capping and sealing together said inner and outer hoses at each end, thereby creating a bladder between the outer surface of such inner hose and the inner surface of such outer hose for containing pressurized fluids leaking from the inner hose after a break in the inner hose, such means being partially encompassed by the outer hose; and d. a locking means for securing said capping and sealing means in place at each end of said inner and outer hoses wherein the locking means are sandwiched between two floating bolts.

7. A dual containment hydraulic system according to claim 6, wherein the capping and sealing means comprises couplers attached to each end of the inner hose.

8. A dual containment hydraulic system according to claim 7, wherein the coupler is a friction fit coupler, screw coupler or torque fit coupler.

9. The dual containment hydraulic system according to claim 8 wherein the outermost set of floating bolts are reverse threaded.

10. The dual containment hydraulic system according to claim 6, wherein the density of the wall of such outer hose and the volume of such bladder are sufficient to maintain equalized pressure of the contained fluid leaking from the inner hose after a break in said inner hose.

11. The dual containment hydraulic system according to claim 6, wherein the density of the wall of such outer hose and the volume of such bladder are sufficient to allow for a reduction in both volume and pressure of the contained fluid.

12. A dual containment hydraulic system comprising:
  (a) an inner hose for transmitting and containing pressurized fluids;
  (b) a means for attaching each end of such inner hose to a hard line coming from a fluid reservoir or pump and going to a specific purpose attachment;
  (c) an outer hose completely encasing such inner hose and such means for attaching each end of said inner hose to a hard line coming from a fluid reservoir or pump and going to a specific purpose attachment; and
  (d) a means for capping and sealing together each end of such outer hose and such hard line coming from a fluid reservoir or pump and going to a specific purpose attachment, thereby creating a bladder between the outer surface of such inner hose and the inner surface of such outer hose for containing pressurized fluids leaking from the inner hose after a break in said inner hose wherein the density of the wall of such outer hose and the volume of such bladder are sufficient to allow for a reduction in both volume and pressure of the contained fluid.

13. The dual containment hydraulic system according to claim 12, wherein the density of the wall of such outer hose and the volume of such bladder are sufficient to maintain equalized pressure of the contained fluid.

14. A dual containment hydraulic system comprising:
  (a) an inner hose for transmitting and containing pressurized fluids;
  (b) an outer hose completely encasing such inner hose; and
  (c) a means for capping and sealing together said inner and outer hoses at each end, thereby creating a bladder between the outer surface of such inner hose and the inner surface of such outer hose for containing pressurized fluids leaking from the inner hose after a break in the inner hose wherein the density of the wall of such outer hose and the volume of such bladder are sufficient to allow for a reduction in both volume and pressure of the contained fluid.

15. The dual containment hydraulic system according to claim 14, wherein the means for capping and sealing said inner and outer hoses comprises a ferrel composite comprising a smaller ferrel welded to the end of a larger ferrel, the end of the inner hose friction fitted over the smaller ferrel and crimped in place and the end of the outer hose friction fitted over the larger ferrel and crimped in place.

16. The dual containment hydraulic system according to claim 15, wherein the means for capping and sealing the inner and outer hoses comprising two ferrel composites wherein the two extreme ends of the system contain the larger ferrels, the two smaller ferrels interfacing with each other.

17. The dual containment hydraulic system according to claim 14, wherein the outermost surface of the outer hose and the outermost surface of the inner hose are lined by crimp.

18. A dual containment hydraulic system comprising:
  (a) an inner hose;
  (b) an outer hose completely encasing such inner hose;
  (c) a coupler for capping and sealing together said inner and outer hoses at each end, thereby creating a bladder between the outer surface of such inner hose and the inner surface of such outer hose for containing pressurized fluids leaking from the inner hose after a break in the inner hose; and
  (d) a locking means for securing said capping and sealing means in place at each end of said inner and outer hoses wherein the density of the wall of such outer hose and the volume of such bladder are sufficient to allow for controlled reduction in both volume and pressure of the contained fluid.

19. The dual containment hydraulic system according to claim 18, wherein the coupler is a friction fit coupler, screw coupler or torque fit coupler.

20. The dual containment hydraulic system according to claim 18, wherein the locking means are sandwiched between two floating bolts.

21. The dual containment hydraulic system according to claim 20, wherein the outermost set of floating bolts are reverse dreaded.

* * * * *

UNITED STATES PATENT AND TRADEMARK OFFICE
CERTIFICATE OF CORRECTION

PATENT NO. : 6,085,796
DATED : July 11, 2000
INVENTOR(S) : Dennis J. Riga

It is certified that error appears in the above-identified patent and that said Letters Patent is hereby corrected as shown below:

<u>Claim 21 - Column 2,</u>
Page 8, Line 51 - last word "dreaded" should be deleted and replaced with "threaded."

Signed and Sealed this

Twelfth Day of June, 2001

*Attest:*

*Attesting Officer*

NICHOLAS P. GODICI
*Acting Director of the United States Patent and Trademark Office*